Mar. 27, 1923.
H. L. FERRIS
HAY CARRIER
Filed Nov. 13, 1920
1,449,899
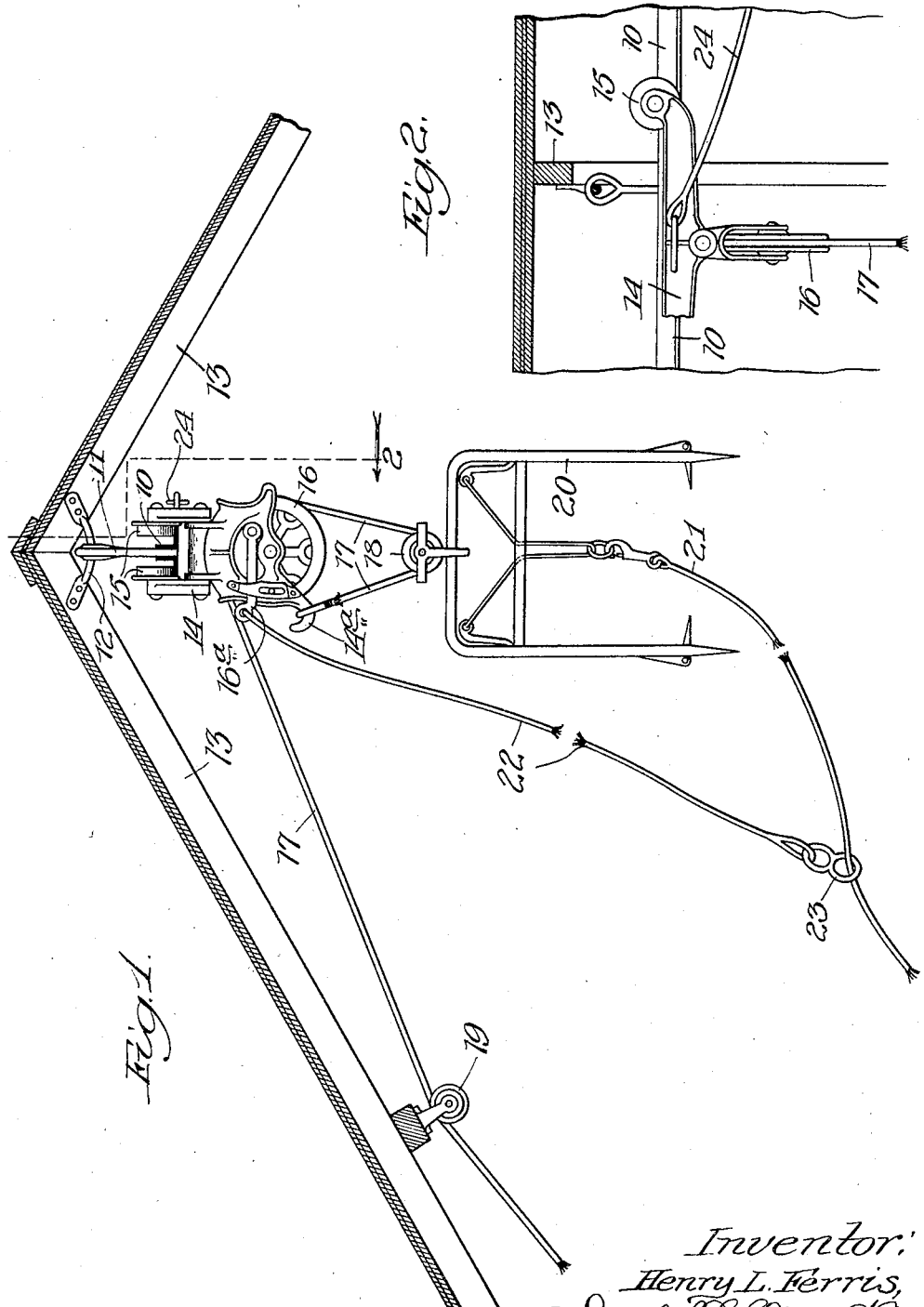

Patented Mar. 27, 1923.

1,449,899

UNITED STATES PATENT OFFICE.

HENRY L. FERRIS, OF HARVARD, ILLINOIS, ASSIGNOR TO HUNT, HELM, FERRIS & COMPANY, OF HARVARD, ILLINOIS, A CORPORATION OF ILLINOIS.

HAY CARRIER.

Application filed November 13, 1920. Serial No. 423,818.

*To all whom it may concern:*

Be it known that I, HENRY L. FERRIS, a citizen of the United States, residing at Harvard, in the county of McHenry and State of Illinois, have invented a new and useful Improvement in Hay Carriers, of which the following is a specification.

This invention relates to hay carriers and is fully described in the following specification and shown in the accompanying drawing in which:

Fig. 1 is a partial transverse vertical section of a barn and hay carrier track, having a hay carrier thereon embodying my invention;

Fig. 2 is a partial side elevation of a hay carrier taken on the line 2 of Fig. 1.

The track 10 is supported by rods 11 carried by the rafter bracket 12, which in turn are bolted to the rafters 13. A hay carrier 14 has flanged wheels journalled thereon which roll on the track 10, thereby permitting the carrier to move longitudinally of the track.

This hay carrier is of the cross draft carrier type such as is illustrated and described in Ferris Patent No. 971,741 granted October 4, 1910 and has a pulley 16 journalled therein and set at right angles to the track 10. A hoisting rope 17 passes over this pulley, under the pulley 18, and is attached at one end to the hook 14ᵃ on the hay carrier 14. The opposite end of the hoisting rope 17 is carried over a suitable pulley such as 19 to the floor level where any suitable source of power such as a team of horses is attached to it. The pulley 18 carries a hay lifting device which in this instance is a double harpoon fork 20 which is well known in the art and which is released by means of a trip rope 21.

The carrier 14 is preferably shown as of the well known cross draft type which has an automatic gripping mechanism (not shown in detail), but which is similar to that shown and described in the above-named patent and which permits the rope 17 to be drawn so as to raise the pulley 18 but which grips the rope 17 as it is slacked, thereby maintaining the fork 20 in the elevated position. This gripping mechanism is released by means of a releasing lever 16ᵃ and the trip rope 22 secured thereto.

Up to this point the mechanism is that which has been commonly employed, and which necessitated the use of two trip ropes 21 and 22 which were long enough to reach from a point near the wagon from which the load is taken to the farthest end of the barn. In the case of very long barns the disadvantages arising from the use of these two long trip ropes becomes quite serious. To avoid this I have made the trip rope 22 only long enough to come within easy reach of the operator when the hay carrier 14 is at a position over the load. This also provides the lower end of the trip rope 22 with an eyelet 23 through which the trip rope 21 is passed, so that the eyelet is slidable upon the latter trip rope.

The method of operation is as follows:

With the parts in the position shown the rope 17 is released by means of the trip rope 22 and the fork 20 will run down by its own weight and may be assisted if necessary by a pull on the rope 21. The fork 20 is then set in the hay in the usual way. Power is then applied to the rope 17 raising the fork 20 with its load of hay to the desired height. The rope 17 is then slackened, causing it to be gripped by the gripping mechanism of the hay carrier and the fork 20 will then be maintained at that height.

The rope 17 is given still more slack as is also the trip rope 21, while the hay carrier 14 is drawn to the end of the barn or as far as desired by means of the rope 24 which is attached to any suitable source of power (not shown).

When the load has been carried as far as desired, the fork 20 is released by means of the trip rope 21 and the load dropped. The rope 24 is then slacked and the hay carrier drawn back to its position over the load of hay by means of the trip rope 21. Thus the trip rope 22 is drawn back within reach of the operator and a pull on this trip rope releases the gripping mechanism on the rope 17 and the fork 20 is again lowered. This arrangement is also used with other types of rope gripping carriers.

It will be understood, of course, that other forms of forks may be employed as well as the well known hay slings which may be released by a trip rope as 21.

Thus it will be seen that the operator has only one long rope, namely 21, to handle during the operation of moving the carrier to the end of the barn and back again to the starting position, the trip rope 22 being very short and being carried along with the trip rope 21.

Although I have shown and described but a single embodiment of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible in view of the prior art.

What I claim as new and desire to secure by Letters Patent is:

1. In combination, a hay carrier, a track on which said carrier runs, a hay fork, a sheave journalled in said hay carrier, a rope on said sheave for supporting said hay fork, a rope grip on the hay carrier permitting said rope to raise the hay fork and holding the rope against movement in the reverse direction, means for moving the hay carrier longitudinally of the track, a trip rope for said hay fork and a trip rope for said rope grip, the last mentioned trip rope being shorter than the first mentioned trip rope and having an eyelet secured to the lower end thereof, said eyelet being slidable on the first mentioned trip rope.

2. In combination, a hay carrier, a track on which said carrier runs, a hay fork, a sheave journalled in said hay carrier, a rope on said sheave for supporting said hay fork, a rope grip on the hay carrier permitting said rope to raise the hay fork and holding the rope against movement in the reverse direction, means for moving the hay carrier longitudinally of the track, a trip rope for said hay fork and a trip rope for said rope grip, the last mentioned trip rope being only of sufficient length to reach to the operator's station when hanging vertically from the hay carrier, said last mentioned trip rope having an eyelet secured to the lower end thereof, said eyelet being slidable on the first mentioned trip rope.

3. In combination, a hay carrier, a track on which said carrier runs, a hay fork, a sheave journalled in said hay carrier, a rope on said sheave for supporting said hay fork, a rope grip on the hay carrier permitting said rope to raise the hay fork and adapted to hold the rope against movement in the reverse direction, means for moving the hay carrier longitudinally of the track, a trip rope for said hay fork and a trip rope for said rope grip, the last mentioned trip rope being only of sufficient length to reach from a convenient point adjacent a load of hay to be raised, when the hay carrier is immediately over said load of hay, said last mentioned trip rope having its free end slidably mounted on the first mentioned trip rope.

4. In combination, a hay carrier, a track on which said carrier runs, a hay fork, a sheave journalled in said hay carrier, a rope on said sheave for supporting said hay fork, a rope grip on the hay carrier permitting said rope to raise the hay fork and adapted to hold the rope against movement in the reverse direction, means for moving the hay carrier longitudinally of the track, a trip rope for said hay fork and a trip rope for said rope grip, one of said trip ropes being only of sufficient length to reach from a convenient point adjacent a load of hay to be raised, when the hay carrier is immediately over said load of hay, said last mentioned trip rope having its free end slidably mounted on the other trip rope.

HENRY L. FERRIS.